Aug. 21, 1962 KENJI TOKITA ETAL 3,049,862
ELECTRIC CLOCK
Filed June 28, 1960
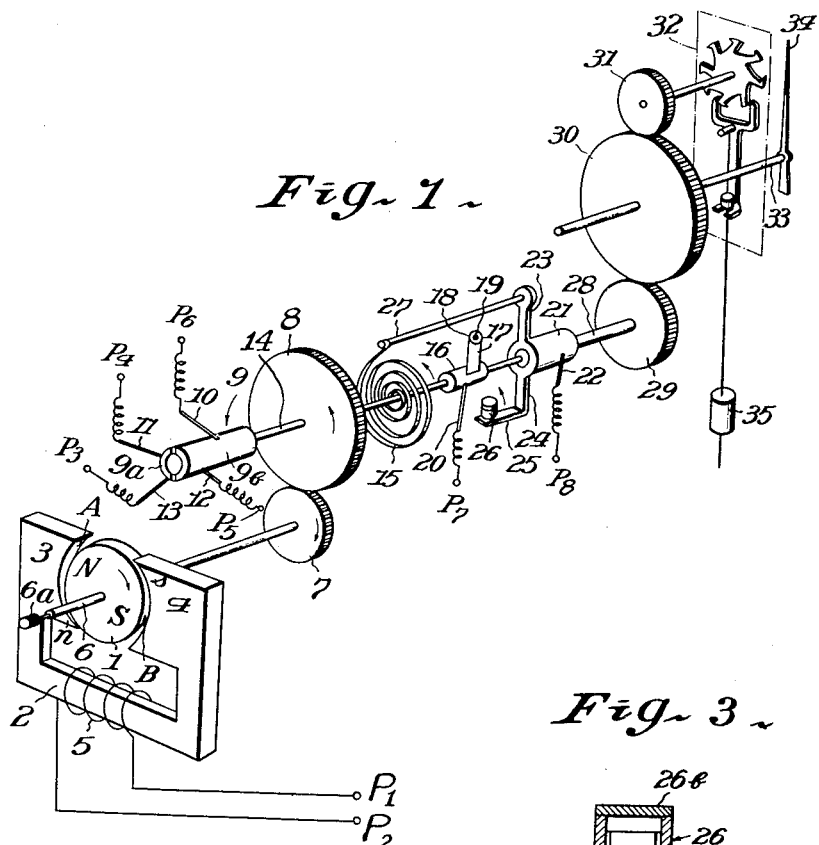
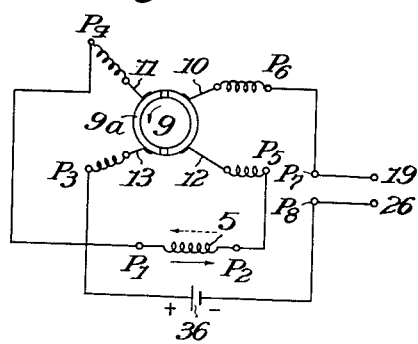
Tomohachi Tsukagoshi
Kenji Tokita
INVENTORS

United States Patent Office 3,049,862
Patented Aug. 21, 1962

3,049,862
ELECTRIC CLOCK
Kenji Tokita, 529 3-chome, Shimomeguro, Meguro-ku, and Tomohachi Tsukagoshi, 23-3 Shimo 1-chome, Kita-ku, both of Tokyo-to, Japan
Filed June 28, 1960, Ser. No. 39,353
Claims priority, application Japan Dec. 15, 1959
1 Claim. (Cl. 58—41)

This invention relates to timepieces, and more particularly to a new electric clock.

It is an object of this invention to provide a new electric clock wherein a constant, average driving torque is imparted to the driven mechanical parts so as to obtain accurate time-keeping operation of the electric clock.

It is another object of this invention to provide an electric clock wherein the said constant driving torque is imparted independently of variations in the driving power of the power supply and other factors.

The foregoing have been attained by the electric clock of this invention, wherein an electric motor which rotates in only one direction is caused intermittently to wind a spiral hairspring which, upon unwinding, drives the speed-regulating mechanism of the clock.

The novel features which are considered as characteristic for the invention are set forth in particular in the appended claim. The invention itself, however, both as to its construction and its method of operation, together with additional objects and advantages thereof, will be best understood from the following description of a specific embodiment when read in connection with the accompanying drawing which illustrates one embodiment of this invention and in which:

FIG. 1 is a somewhat diagrammatic perspective view of the principal components of the illustrated embodiment of the invention;

FIG. 2 is an electrical circuit diagram showing the pole changing in the magnetic circuit of the electric motor of the embodiment of FIG. 1; and FIG. 3 is an enlarged side-elevational view, in section, of a cup-shaped contactor used in the embodiment of FIG. 1.

As shown in the drawing, a rotating magnet 1 has a rotating shaft 6 and two magnetic poles N and S while a stator 2 has a magnetic exciting winding 5 wound therearound and magnetic pole pieces 3 and 4 disposed on opposite sides of and separated by narrow air gaps A and B from the rotating magnet 1. These air gaps are asymmetrical with respect to the rotating shaft 6, and when the stator is magnetized so that the magnetic poles 3 and 4 confront the poles N and S of the rotating magnet 1 with the same polarity, respectively, the rotating magnet 1 is driven in one direction. In the embodiment illustrated in the drawing, the rotating magnet 1 is made to rotate in the direction of the arrow shown in each case.

A pinion 7 is fixed to the rotating shaft 6 and is enmeshed with a large gear 8, the gear ratio being 1 to 2 so that, for every ½ revolution of the shaft 6, a rotating shaft 14 carrying gear 8 is rotated through ¼ revolution. On one end of shaft 14 there is affixed a contact-pole-changing cylinder 9, commonly called a commutator, comprising contact segments 9a and 9b which are insulated from each other and extend each over nearly 180 degrees and which co-operate with brushes 11, 13 and 10, 12. On the other end of shaft 14 there are affixed the inner end of a spiral hairspring 15 and a cylinder 16 supporting a first contact point. A contact arm 17, which supports an iron piece 18 having a silver contact point 19, is carried on cylinder 16. At the same time, a brush 20 is in contact with cylinder 16. A cylinder 21 is supported coaxially with cylinder 16 so as to rotate concurrently therewith and has arms 23 and 24. The arm 23 is connected by a rod 27 to the outer end of the aforesaid spiral hairspring 15; to arm 24 is affixed an elastic bracket 25, the end of which supports a cup shaped contactor 26. The positions of the contact arm 17 and the support bracket 25 are so selected on their respective paths of rotation that the contact point 19 and the contactor 26 will engage each other.

The cup-shaped contactor 26, as clearly indicated on an enlarged scale in FIG 3, has a magnetic piece 26a within its interior and a contact piece 26b on top of magnetic piece 26a.

A brush 22 is in contact with cylinder 21 and a gear 29 is fixed to a shaft 28 extending from the cylinder 21. The torque of gear 29 is transmitted through gears 30 and 31 to drive a speed regulating mechanism 32. A pendulum weight 35 is hung from said speed-regulating mechanism, and a second hand 34 is mounted on the shaft 33 of the gear 30.

The minute and hour hands (not shown) are driven by conventional mechanisms (not shown), and since these members are well known in the prior art, they will be omitted herein.

The operation of the above-described embodiment may be best understood by reference to the following detailed description with further reference to the accompanying drawing.

The electrical terminals $P_1$ and $P_2$ of the electromagnetic winding 5, and the terminals $P_3$ through $P_6$, $P_7$ and $P_8$ of the brushes 10 through 13, 20 and 22, respectively, are connected with a storage battery 36 as indicated in FIG. 2. If, initially, the mechanism is released with the spiral hairspring 15 in the fully wound condition, the contact arm 17, support bracket 25, and rotating magnet 1 will be stationary in their respective positions as shown in the drawing. Then, as the hairspring 15 gradually unwinds according to the control action of the speed-regulating mechanism 32, the unwinding motion is transmitted through rod 27 and arm 23 to cause the contactor 26 to rotate in the direction of the arrow until it approaches the contact point 19. Simultaneously with this approach, the magnetic piece 26a attracts the iron piece 18, and the contact point 19 is brought into firm and positive engagement with the contact piece 26b.

If, say, a contactor 26 lacking the magnetic piece 26a were used, the unwinding force of the spiral hairspring 15, which is unwinding under the control of the speed-regulating mechanism 32, would be extremely weak, and the contact pressure between the contactor 26 and the point 19 would be extremely low. Moreover, the contact arm 17, support bracket 25, and other such parts would have to be delicately constructed and lack rigidity. Therefore, the aforesaid contacting action would be subject to chattering. Consequently, it would not be possible to obtain positive reversal of energization of the magnetic exciting winding 5. By the use of a contactor 26 which has a magnetic piece 26a, on the other hand, positive and immediate contact is made by the attraction of the iron piece 18 whenever the contactor 26 approaches the contact point 19, and the reversal of energization of the magnetic exciting winding 5 is effected positively.

When point 19 and contactor 26 are brought into contact as described above, electric current, in FIG. 2, flows instantly through the circuit from the positive (+) terminal of the storage battery 36 through the members $P_3$, 13, 9a, 11, $P_4$, $P_1$, 5, $P_2$, $P_5$, 12, 9b, 10, $P_6$, $P_7$, 19, 26, $P_8$ to the negative (−) terminal of this battery. The electric current flows in the direction of the full-line arrow through the winding 5, and north (n) and south (s) magnetic poles are created in the magnetic pole pieces 3 and 4, respectively. However, since the magnetic pole pieces 3 and 4 are formed asymmetrically and form gaps A, B converging in counterclockwise direction as viewed in FIG. 2, the rotating magnet 1 is advanced through 180° in the direction of the arrow (i.e. clockwise) and then stops. This rotation causes the commutator cylinder 9 to rotate through 90° and then to stop, and the brushes 11 and 10 are brought into engagement with the contact segment 9b while the brushes 13 and 12 contact the segment 9a. The rotation of the commutator cylinder 9, together with its shaft 14, causes the spiral hairspring 15 to be wound in the direction of the arrow, i.e. counterclockwise as viewed in FIG. 1. At the same time, the cylinder 16 is also rotated in the same counterclockwise direction, and contact point 19 is forcibly released from the contactor 26 and advances therebeyond by 90°. Instantly thereafter, the spiral hairspring 15 begins to unwind gradually in accordance with the control action of the speed-regulating mechanism 32. As a result, the contactor 26 gradually approaches the contact point 19 and engages it positively as before. Simultaneously with this contacting, electric current, in FIGURE 2, flows through the circuit from positive (+) terminal of the storage battery 36 through the members $P_3$, 13, 9a, 12, $P_5$, $P_2$, 5, $P_1$, $P_4$, 11, 9b, 10, $P_6$, $P_7$, 19, 26, $P_8$ to the negative (−) terminal of the storage battery, thus in the direction indicated by the dotted-line arrow, and causes conversion of the magnetic pole pieces 3 and 4 to the opposite polarities. However, the rotating magnet 1 is now in the diametrically opposite position and, therefore, will rotate through 180° in the same direction as before and stop. Accordingly, the winding of the spiral hairspring 15, the separation of the contact point 19 from contactor 26 by 90 degrees, and its reapproach to and re-engagement of the contactor 26 are carried out in the same manner as before.

In the above manner the winding and unwinding of the spiral hairspring are repeated successively, the resulting rotation being controlled by the speed-regulating mechanism, and the second hand 34 along with the minute and hour hands (not shown) are driven.

Upon initially connecting the electric clock, or in the event of a power failure, the spiral hairspring 15, being in a fully unwound condition, will not be able to start the system. However, by providing a grip 6a on the rotating shaft 6 of the rotating magnet 1 of the electric motor and by winding the aforesaid spring by means of this grip 6a the system can be started. The grip 6a may alternatively be installed on the shaft 14.

By the system of this invention, since the unwound condition of the spiral hairspring is controlled by the speed-regulating mechanism only, independently of the variations of the driving power on the motor side, friction, etc., a constant torque is always imparted to the speed-regulating mechanism, and it is possible to provide an accurate clock drive.

While we have described a particular embodiment of our invention, it will, of course, be understood that we do not wish our invention to be limited thereto, since many modifications may be made, and we, therefore, contemplate by the appended claim to cover all such modifications as fall within the true spirit and scope of our invention.

What we claim is:

In an electric clock, in combination, a direct-current motor having a rotatable magnetic armature, a stator having at least one pair of poles adjacent said armature, and a stator winding adapted to energize said poles; a commutator rotatable by said armature; at least two pairs of angularly spaced brushes engaging said commutator for successively reversing the flow of current through said winding, said winding bridging one of said pairs of brushes; a spiral spring one end of which is coupled with said commutator, said spring being adapted to be wound by said motor upon rotation of said armature; a clock mechanism having a drive gear coupled with the other end of said spring and adapted to be rotated thereby; a source of direct current for energizing said winding; and switch means connected in series with said source across the other of said pairs of brushes, said switch means including a first contact member coupled with said drive gear and a second contact member coupled with said armature and engageable with said first contact member upon unwinding of said spring to energize said motor, one of said members being magnetic and adapted to attract the other member upon the approach of said members toward each other.

References Cited in the file of this patent
UNITED STATES PATENTS

| | | |
|---|---|---|
| 1,193,012 | Goodson | Aug. 1, 1916 |
| 1,733,689 | Lux | Oct. 29, 1929 |
| 2,694,286 | Frantellizi | Nov. 16, 1954 |

FOREIGN PATENTS

| | | |
|---|---|---|
| 19,261 | Great Britain | Sept. 25, 1899 |
| 153,911 | Germany | Aug. 2, 1904 |
| 1,078,242 | France | May 5, 1954 |